United States Patent Office 3,792,175
Patented Feb. 12, 1974

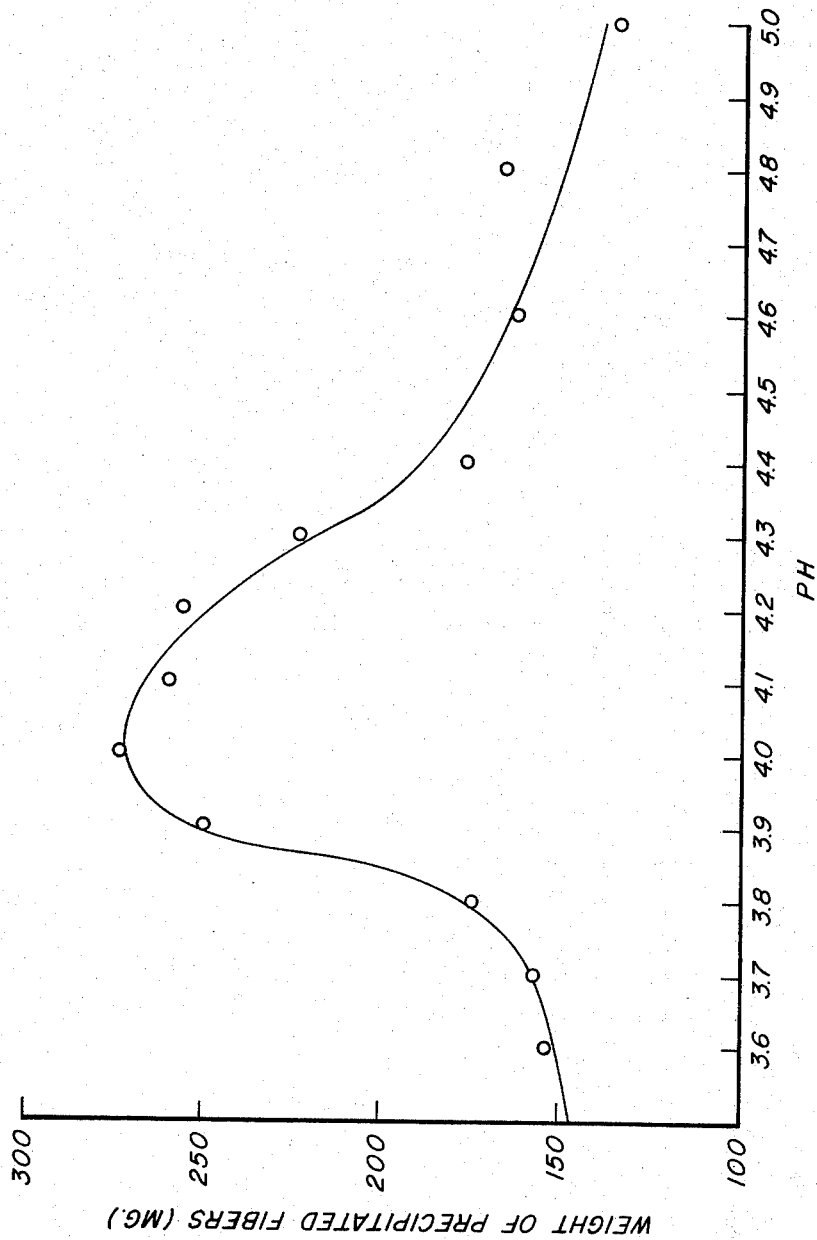

3,792,175
FIBRILLAR SOY WHEY PROTEIN COMPLEX
Edward Emil Schmitt, Norwalk, Conn., assignor to American Cyanamid Company, Stamford, Conn.
Filed Oct. 21, 1971, Ser. No. 191,271
Int. Cl. A23j 3/00
U.S. Cl. 426—364  7 Claims

ABSTRACT OF THE DISCLOSURE

A fibrillar soy whey protein complex is produced by contacting soy whey with a polysaccharide solution containing carrageenan at a pH ranging from about 3.85 to about 4.35 with stirring.

BACKGROUND OF THE INVENTION

The production of stable food products from protein slurries or solutions has become of considerable importance in the last few decades. More specifically, soy bean whey, which is the soluble protein remaining after the bulk of the protein is removed by isoelectric precipitation from aqueous extracts of defatted soy bean meal, comprises a mixture of dissolved proteinaceous substances to the extent of upwards of 20% of the original protein composition of the bean. J. J. Rackis et al. report typical proximate analysis of soybean whey solids as follows:

| Constituent: | Percent |
|---|---|
| Carbohydrate | 62.1 |
| Total protein | 20.5 |
| Ash | 5.5 |
| Others | 11.9 |

Journal of Food Science, 36, page 10, (1971).

Soy bean whey, which has been demonstrated to have an excellent balance of essential amino acids (Rackis et al. Cereal Chem., 40, 531, (1963)) has been treated to recover the valuable proteinaceous substances by a variety of techniques none of which have particularly proven to be industrially feasible. Furthermore, a great imbalance of the essential amino acids occurs when the whey is fractionated into heat coagulable and supernatant protein fractions.

Generally, it has not proven economical to recover these useful proteinaceous materials and thereby retain their high nutritive value and therefore large quantities of soy bean whey are generally discarded through industrial disposal systems.

More recently, U.S. Pat. No. 3,069,327 has disclosed a process whereby soy bean whey is treated with a small amount of an aqueous solution of a polysaccharide gum whereby the polysaccharide gum complexes with the proteinaceous material in the whey to form a precipitate which can be recovered by freeze drying. The patent discloses conducting the process at a pH of 4.4 to 4.6. The resultant polysaccharide complex exists as a gel solution which is tacky and very difficult to handle and directly utilizing ordinary equipment.

SUMMARY OF THE INVENTION

I have now discovered a novel process whereby proteinaceous material can be recovered from soy bean whey in fibrillar form. As such, the fibrillar protein complexes can be readily filtered and thereby recovered much more economically than those gel materials of the prior art mentioned above. The composition of the protein obtained in such a fibrillar complex consists of an excellent balance of essential amino acids resembling closely the amino acid composition of whole whey. My novel process enables the production of texturized food products at an economic rate and represents a convenient method of removing protein from various commercial process streams thereby creating an additional source of food product and maintaining pollution control of the waterways.

DESCRIPTION OF THE DRAWING

The drawing depicts a graphic representation of the weight of precipitated fibrous complex in milligrams recovered as the pH of the reaction media is varied according to the process of the instant invention. As can be readily ascertained, the greatest concentration of complex is recovered between a pH ranging from about 3.85 to about 4.35. The points on the graph of the drawing are taken from results set forth in Example 4, below.

DESCRIPTION OF THE INVENTION INCLUDING PREFERRED EMBODIMENTS

As mentioned above, I have discovered that by careful control of the pH conditions during the contacting of soy bean whey with polysaccharide solutions, I can produce fibrous proteinaceous complex by convenient coacervation precipitation.

According to my novel process, soy bean whey is contacted with a polysaccharide under various stringent conditions. The polysaccharide is preferably employed as an aqueous solution and comprises any known polysaccharide in combination with at least about 10%, by weight, based on the weight of the combination, of carrageenan. More specifically, from about 0.001% to about 5.0%, by weight, based on the weight of the protein in the soy bean whey charge, of a polysaccharide containing at least about 10%, by weight, based on the total weight of the polysaccharide, of carrageenan, is employed. Carrageenan per se may be employed as such or in solution as long as the above concentrations are maintained.

Examples of suitable polysaccharides which may be used in the instant process in combination with carrageenan include Irish moss, gum karaya, sodium alginate, alginic acid, agar, gum tragacanth, sodium carboxymethycellulose, gum arabic and the like. Derivatives, reaction products and fractions of carrageenan such as those disclosed in the U.S. Pat. No. 3,252,961, which patent is hereby incorporated herein by reference, can also be used.

The carrageenan (polysaccharide) complex with the proteins of the soy whey when contacted therewith as disclosed in the above mentioned U.S. patent.

The process of the present invention is conducted by mixing the soy bean whey with the polysaccharide, at the pH of the whey, at a temperature ranging from about 10° C. to about 50° C., preferably at ambient temperature, and at atmospheric pressure. Superatmospheric or subatmospheric pressure may be utilized if desired, appropriate changes in the temperature ranges, of course, being made.

The polysaccharide and the soy bean whey are allowed to remain in contact for a time sufficient to dissolve all the ingredients thereof. After the ingredients are dissolved, it is critical that the pH be adjusted within the range of from about 3.85 to about 4.35, preferably from about 3.90 to about 4.25, with any suitable acidulent such as citric acid, acetic acid and the like.

Alternately, the polysaccharide solution can be adjusted to about pH 4 and added, with stirring, to the whey solution pretreated with the appropriate acidulant such that the pH falls within the range of 3.85 to 4.35 and preferably from about 3.90 to 4.25 when the two solutions are mixed.

It is also critical that the reaction media be continually stirred during my novel process while the pH is being adjusted and maintained within the above mentioned range. The stirring is necessary in order to reduce the pH of the entire reaction media in a substantially uniform manner and thereby prevent areas of the reaction media

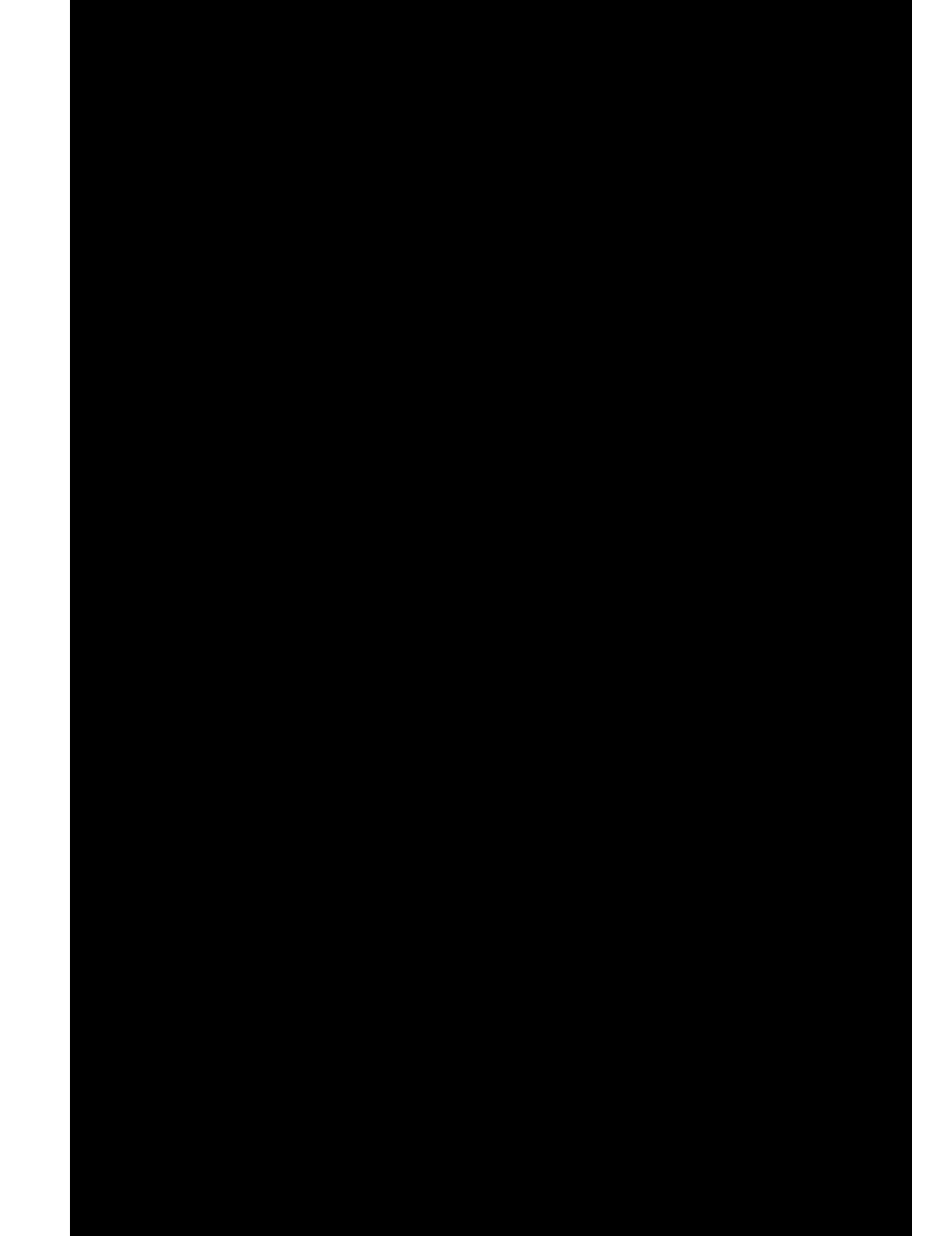

TABLE III

| pH of soy whey-carrageenan media | Parts of fibrous complex |
|---|---|
| 3.6 | .152 |
| 3.7 | .155 |
| 3.8 | .174 |
| 3.9 | .250 |
| 4.0 | .264 |
| 4.1 | .260 |
| 4.2 | .255 |
| 4.3 | .245 |
| 4.4 | .175 |
| 4.6 | .165 |
| 4.8 | .170 |
| 5.0 | .141 |

EXAMPLES 6–12

Example 2 is again carried out in every detail with the exception that the polysaccharide in the aqueous 0.5% polysaccharide solution is varied. The compositions of the polysaccharide and yield of final fibrous complex are reported in Table IV, below.

TABLE IV

| | Polysaccharide composition | Conc. | Fibrous complex Yield, parts |
|---|---|---|---|
| Example: | | | |
| 6 | Carrageenan/CMC [1] | 25/75 | .175 |
| 7 | do | 50/50 | .178 |
| 8 | do | 75/25 | .182 |
| 9 | Carrageenan/guar gum | 50/50 | .169 |
| 10 | Carrageenan/sodium alginate | 75/25 | .174 |
| 11 | Carrageenan/gum arabic | 75/25 | .166 |
| 12 | Carrageenan/Agar | 75/25 | .171 |

[1] CMC=Carboxymethylcellulose.

EXAMPLE 13

A portion of the product from Example 1 is dissolved in an aqueous medium and adjusted to pH 8.0 with dilute NaOH solution. The solution is filtered and, with mild stirring is readjusted to pH 3.9. A fibrous complex precipitates and is then filtered and air dried. The product has the same mass and volume as it had before it was reprecipitated.

EXAMPLE 14

Lean beef (12.50 lbs.) is ground through a 1" grinder plate and then through a 1/8" grinder plate, and lean pork trimmings (12.50 lbs.) are also preground through a 1" grinder plate. The ground meat, 25.0 lbs. of the fibrous soy protein complex produced in Example 1, sodium chloride (1.0 lb.), sodium nitrate (28.0 gm.), sodium nitrite (3.50 gm.), cane sugar (56.70 gm.) and ice (14.0 lbs.) are treated in a silent cutter for 3 minutes. A seasoning of dextrose (32 gm.), cardamon (24 gm.), black pepper (20 gm.) and red pepper (8 gm.) are added and mixing is continued until the temperature has risen to 60° F. The emulsion is stuffed into 27/32" frankfurther casings by means of a small commercial stuffing machine, and the resultant frankfurters are smoked to an internal temperature of 150° F. The resultant frankfurters are very juicy and succulent when cooked in boiling water for 9 minutes.

I claim:
1. A method which comprises contacting soy bean whey with from about 0.001% to about 5.0%, by weight, based on the weight of the protein in said whey, of a polysaccharide containing at least about 10%, by weight, of a carrageenan, the remainder, if any, being Irish moss, gum karaya, sodium alginate, alginic acid, carboxymethylcellulose, agar, gum tragacanth, sodium carboxymethylcellulose, gum arabic or derivatives, reaction products and fractions of carrageenan, at a pH ranging from about 3.85 to about 4.35 with stirring and recovering the resultant fibrillar proteinaceous complex.

2. A method according to claim 1 wherein said pH ranges from about 3.90 to about 4.25.

3. A method according to claim 1 wherein the temperature ranges from about 10° C. to about 50° C.

4. A method according to claim 1 wherein said polysaccharide contains only a carrageenan.

5. A method according to claim 1 wherein the fibrillar complex is recovered by filtration through a 20 to 40 mesh material.

6. A method according to claim 1 wherein said polysaccharide contains a mixture of carrageenan and carboxymethylcellulose.

7. A method according to claim 1 wherein said polysaccharide contains a mixture of carrageenan and guar gum.

References Cited
UNITED STATES PATENTS

| 3,627,536 | 12/1971 | Arima et al. | 99—17 |
| 3,407,076 | 10/1968 | Ganz | 99—139 |

A. LOUIS MONACELL, Primary Examiner

J. R. HOFFMAN, Assistant Examiner

U.S. Cl. X.R.

260—123.5